United States Patent
Dube et al.

(10) Patent No.: US 9,228,438 B2
(45) Date of Patent: Jan. 5, 2016

(54) VARIABLE VANE HAVING BODY FORMED OF FIRST MATERIAL AND TRUNNION FORMED OF SECOND MATERIAL

(71) Applicants: David P. Dube, Saco, ME (US); Steven J. Feigleson, Falmouth, ME (US); Richard K. Hayford, Cape Neddick, ME (US)

(72) Inventors: David P. Dube, Saco, ME (US); Steven J. Feigleson, Falmouth, ME (US); Richard K. Hayford, Cape Neddick, ME (US)

(73) Assignee: United Technologies Corporation, Hartford, CT (US)

( * ) Notice: Subject to any disclaimer, the term of this patent is extended or adjusted under 35 U.S.C. 154(b) by 487 days.

(21) Appl. No.: 13/717,928

(22) Filed: Dec. 18, 2012

(65) Prior Publication Data

US 2014/0169950 A1 Jun. 19, 2014

(51) Int. Cl.
*F01D 9/04* (2006.01)
*B23P 11/00* (2006.01)
*F01D 5/14* (2006.01)
*F01D 17/16* (2006.01)

(52) U.S. Cl.
CPC .............. *F01D 5/147* (2013.01); *F01D 17/162* (2013.01); *Y02T 50/672* (2013.01); *Y10T 29/49826* (2015.01); *Y10T 156/10* (2015.01)

(58) Field of Classification Search
CPC ......... F01D 9/04; F01D 5/147; F01D 17/162; B23P 11/00
See application file for complete search history.

(56) References Cited

U.S. PATENT DOCUMENTS

| 4,652,208 | A | * | 3/1987 | Tameo ........................ 415/162 |
|---|---|---|---|---|
| 5,411,370 | A | | 5/1995 | Varsik |
| 5,492,446 | A | * | 2/1996 | Hawkins et al. .............. 415/160 |
| 5,807,072 | A | | 9/1998 | Payling |
| 6,887,035 | B2 | | 5/2005 | Bruce |
| 6,969,239 | B2 | | 11/2005 | Grant et al. |
| 7,220,098 | B2 | | 5/2007 | Bruce et al. |
| 7,223,066 | B2 | | 5/2007 | Rockley |
| 7,503,750 | B1 | | 3/2009 | Violette |
| 7,802,963 | B2 | * | 9/2010 | Holland et al. .............. 415/148 |
| 2004/0115051 | A1 | * | 6/2004 | O'Reilly et al. ........... 415/209.2 |
| 2004/0223850 | A1 | | 11/2004 | Kramer et al. |
| 2005/0008489 | A1 | | 1/2005 | Perruchant et al. |
| 2006/0110246 | A1 | * | 5/2006 | Bruce ........................... 415/160 |
| 2009/0317241 | A1 | | 12/2009 | Major |
| 2011/0110783 | A1 | | 5/2011 | Addis et al. |
| 2012/0201691 | A1 | | 8/2012 | Dautl et al. |

OTHER PUBLICATIONS

International Search Report and Written Opinion for International Application No. PCT/US2013/074309 completed on Mar. 17, 2014.
U.S. Appl. No. 13/437,988, filed on Apr. 3, 2012, Entitled "Variable Vane Inner Platform Damping".
International Preliminary Report on Patentability for PCT Application No. PCT/US2013/074309, mailed Jul. 2, 2015.

* cited by examiner

*Primary Examiner* — Igor Kershteyn
(74) *Attorney, Agent, or Firm* — Carlson, Gaskey & Olds, P.C.

(57) ABSTRACT

A variable vane includes a variable vane body that has an airfoil portion. The variable vane body is formed of a first material. A trunnion is attached at one end of the variable vane body. The trunnion includes a pivot formed of a second, different material.

18 Claims, 5 Drawing Sheets

VARIABLE VANE HAVING BODY FORMED OF FIRST MATERIAL AND TRUNNION FORMED OF SECOND MATERIAL

BACKGROUND

This disclosure relates to a multi-material variable vane for use in a turbomachine.

Turbomachines typically include a compressor section, a combustor section and turbine section. An aircraft turbomachine can additionally include the fan section for propulsion. Airfoil arrays in the compressor section rotate to compress the air, which is then mixed with fuel and combusted in the combustor section. The combustion products are expanded over the turbine section to rotationally drive airfoil arrays in the turbine section. The rotation of turbine section drives rotation of the fan, if used, and compressor section.

Some turbomachines, such as gas turbine engines, include variable vanes that can be pivoted about their individual axes to influence how airflow moves through the turbomachine. For example, the first few stages of the compressor section may include variable vanes stages. Typically, the variable vanes are robustly designed to handle the stress loads that are applied to change the position of the vanes.

SUMMARY

A variable vane according to an exemplary aspect of the present disclosure includes a variable vane body that has an airfoil portion. The variable vane body is formed of a first material and a trunnion is attached at one end of the variable vane body. The trunnion includes a pivot formed of a second, different material.

In a further non-limiting embodiment, the first material has a first density and the second material has a second density that is greater than the first density.

In a further non-limiting embodiment of any of the foregoing examples, the first material has a first strength and a second material has a second strength that is greater than first strength.

In a further non-limiting embodiment of any of the foregoing examples, the first material is selected from the group consisting of aluminum, aluminum-based alloys, magnesium, magnesium-based alloys, polymers, polymer-matrix composites and combinations thereof, and the second material is selected from the group consisting of nickel, nickel-based alloys, titanium, titanium-based alloys, steel, cobalt, cobalt-based alloys and combinations thereof.

In a further non-limiting embodiment of any of the foregoing examples, the first material is an aluminum-based material and the second material is selected from the group consisting of nickel, nickel-based alloys, titanium, titanium-based alloys, steel, cobalt, cobalt-based alloys and combinations thereof.

In a further non-limiting embodiment of any of the foregoing examples, the first material is a polymer-matrix composite and a second material is selected from the group consisting of nickel, nickel-based alloys, titanium, titanium-based alloys, steel, cobalt, cobalt-based alloys and combinations thereof.

In a further non-limiting embodiment of any of the foregoing examples, the trunnion includes a flange connected to the pivot, and the flange is adhesively bonded to the variable vane body.

In a further non-limiting embodiment of any of the foregoing examples, the variable vane body includes a first anti-rotation member and the trunnion includes a second anti-rotation member that interlocks with the first anti-rotation member such that relative rotational movement between the trunnion and the variable vane body is limited.

In a further non-limiting embodiment of any of the foregoing examples, one of the first anti-rotation member or the second anti-rotation member includes an elongated ridge and the other of the first anti-rotation member or the second anti-rotation member includes a channel.

In a further non-limiting embodiment of any of the foregoing examples, the variable vane body includes a first alignment member and the trunnion includes a second alignment member inter-fit with the first alignment member such that a central axis of the variable vane body aligns with a central axis of the pivot.

In a further non-limiting embodiment of any of the foregoing examples, one of the first alignment member or the second alignment member is a pin and the other of the first alignment member or the second alignment member is a hole.

In a further non-limiting embodiment of any of the foregoing examples, the pivot includes a plurality of flat bearing surfaces.

In a further non-limiting embodiment of any of the foregoing examples, the trunnion is adhesively bonded to the variable vane body.

In a further non-limiting embodiment of any of the foregoing examples, the trunnion is welded or brazed to the variable vane body.

A turbomachine according to an exemplary aspect of the present disclosure includes a fan, a compressor section which includes a plurality of variable vanes, a combustor in fluid communication with the compressor section, and a turbine section in fluid communication with the combustor. Each of the plurality of variable vanes includes a variable vane body having an airfoil portion and a trunnion attached at one end of the variable vane body. The variable vane body is formed of a first material and the trunnion includes a pivot formed of a second, different material.

In a further non-limiting embodiment of any of the foregoing examples, the first material has a first density and the second material has a second density that is greater than the first density.

In a further non-limiting embodiment of any of the foregoing examples, the first material is selected from the group consisting of aluminum, aluminum-based alloys, magnesium, magnesium-based alloys, polymers, polymer-matrix composites and combinations thereof, and the second material is selected from the group consisting of nickel, nickel-based alloys, titanium, titanium-based alloys, steel, cobalt, cobalt-based alloys and combinations thereof.

In a further non-limiting embodiment of any of the foregoing examples, the variable vane body includes a first anti-rotation member and the trunnion includes a second anti-rotation member that interlocks with the first anti-rotation member such that relative rotational movement between the trunnion and the variable vane body is limited.

A method of assembling a variable vane according to an exemplary aspect of the present disclosure includes providing a variable vane body which includes an airfoil portion. The variable vane body is formed of a first material. A trunnion is then provided, which includes a pivot formed of a second, different material. The trunnion is then attached to one end of the variable vane body.

In a further non-limiting embodiment of any of the foregoing examples, the attachment between the trunnion and the variable vane body includes adhesively bonding, welding or brazing the trunnion to the variable vane body.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
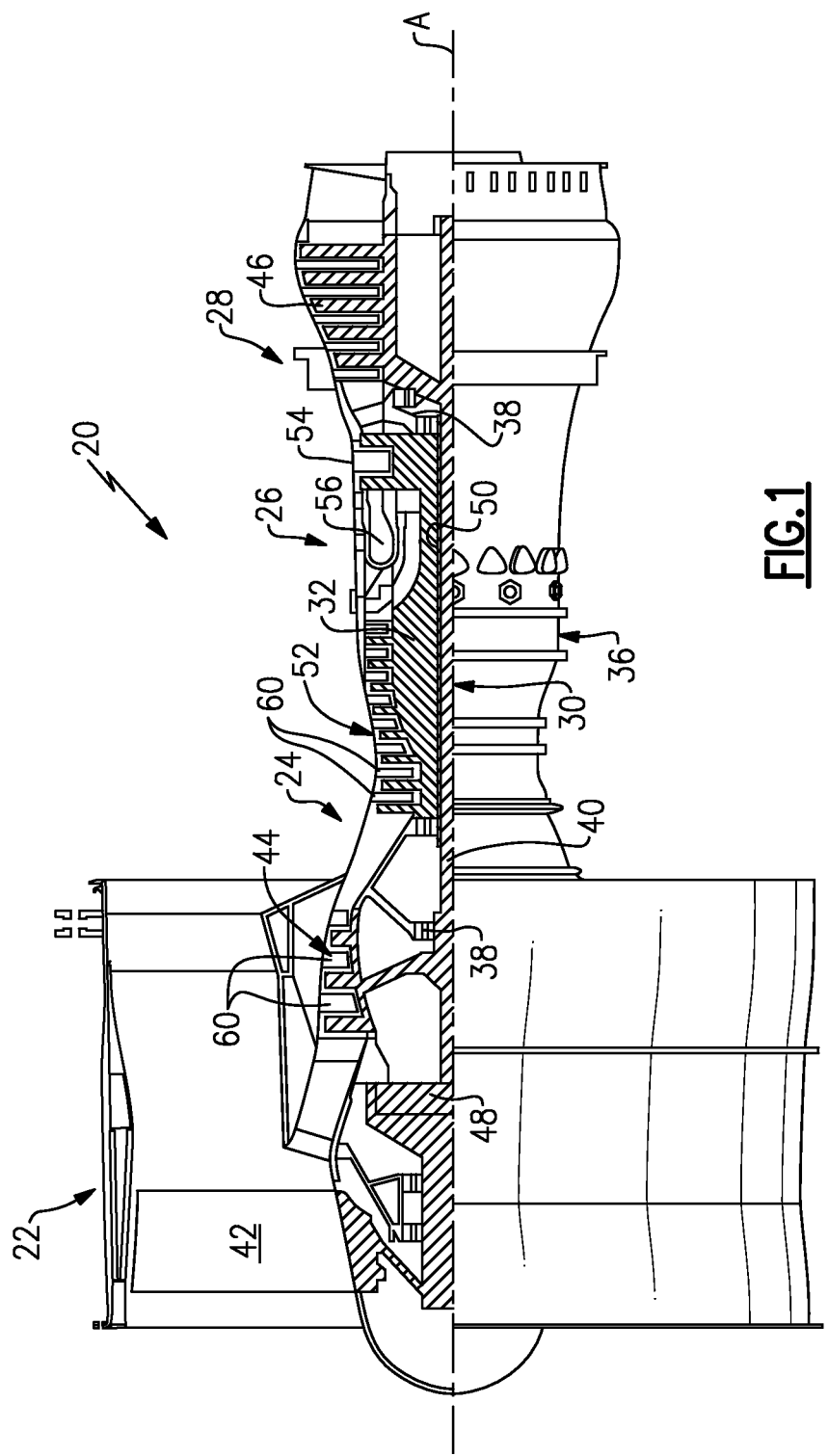
FIG. 1 illustrates an example gas turbine engine.

FIG. 1 schematically illustrates a turbomachine, which in this example is a gas turbine engine 20. The gas turbine engine 20 is disclosed herein as a two-spool turbofan that generally incorporates a fan section 22, a compressor section 24, a combustor section 26 and a turbine section 28. Alternative turbomachines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbomachines, including three-spool architectures and ground-based turbines that do not have fans.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 feet, with the engine at its best fuel consumption. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.45. "Low corrected fan tip speed" is the actual fan tip speed in feet per second divided by an industry standard temperature correction of $[(Tram° R)/(518.7° R)]^{0.5}$. The "Low corrected fan tip speed" as disclosed herein according to one non-limiting embodiment is less than about 1150 feet per second.

Figure 2:
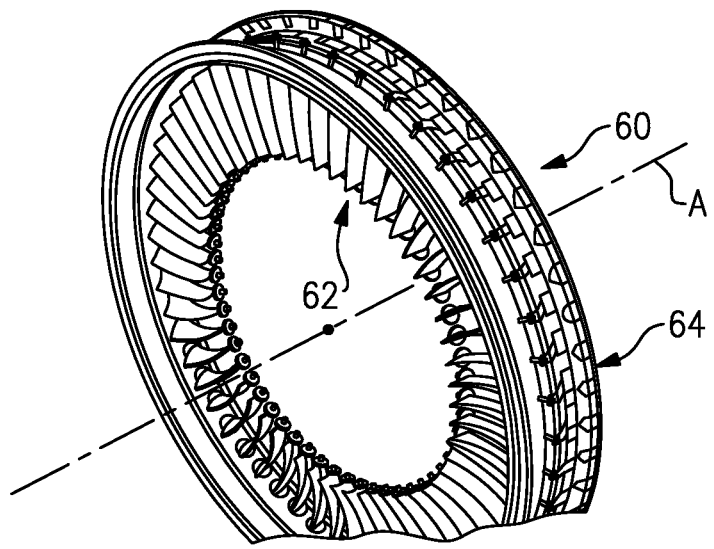
FIG. 2 illustrates a plurality of variable vanes mounted in an outer case.
Figure 3:
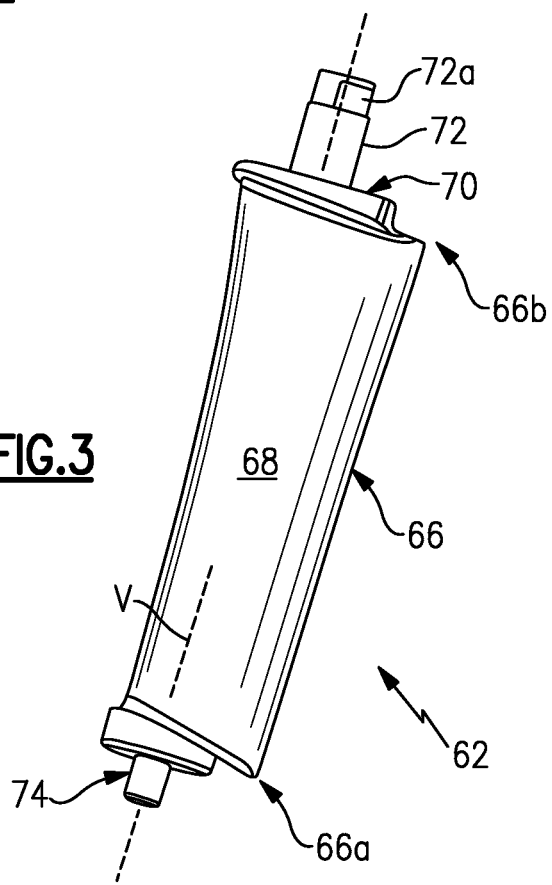
FIG. 3 illustrates one of the variable vanes of FIG. 2.
Figure 4:
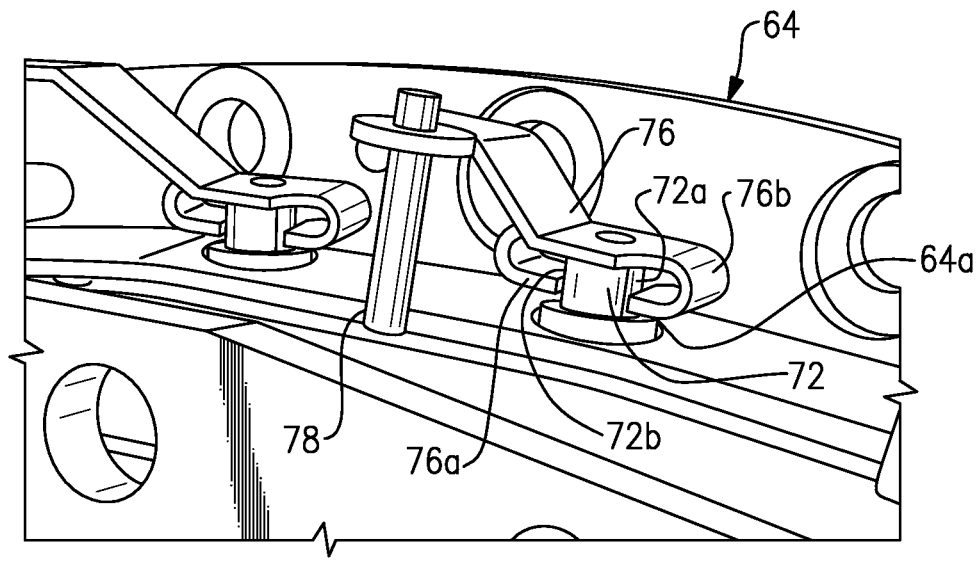
FIG. 4 illustrates a view of a variable vane mounted in an outer case.

Referring to FIGS. 2-4, with continued reference to FIG. 1, the first few stages of each of the first compressor 44 and/or the second compressor 52 include variable vane assemblies 60. Each of the variable vane assemblies 60 includes a plurality of variable vanes 62 circumferentially arranged around the engine central axis A. Each of the variable vanes 62 is mounted relative to an outer case 64.

The variable vanes 62 each include a variable vane body 66 that has an airfoil portion 68. As an example, the airfoil portion 68 has a wing-like shape that provides a lift force via Bernoulli's principle such that one side of the airfoil portion 68 generally operates as a suction side and the opposing side of the airfoil portion 68 generally operates as a pressure side. Each of the variable vanes 62 generally spans between an inner diameter end 66a and an outer diameter end 66b relative to the engine central axis A. The variable vane body 66 is formed of a first material.

A trunnion 70 is attached at the outer diameter end 66b of the variable vane body 66 in this example. The trunnion 70 includes a pivot 72 that is formed of a second, different material from the first material of the variable vane body 66.

In a further example, the second material is different from the first material in at least one of composition and mechanical properties. As will be discussed in further detail below, the multi-material variable vane 62 can reduce weight and permit tailoring of the design of the variable vane 62 to different design factors at different locations on the variable vane 62.

In this example, each of the variable vanes 62 also includes a pivot pin 74 at the inner diameter end 66*a* that is receivable into a corresponding socket (not shown) such that the variable vane 62 can pivot about vane axis V.

When mounted in the outer case 64, the pivot 72 of the trunnion 70 extends through an opening 64*a* in the outer case 64. A vane arm 76 connects to the pivot 72. The vane arm 76 in this example includes two opposed arms 76*a*/76*b* that engage, respectively, flat bearing surfaces 72*a*/72*b* on the pivot 72 of the trunnion 70. At an opposing end of the vane arm 76, is a pin 78. Each of the variable vanes 62 connects with a corresponding vane arm 76 and pin 78. The pins 78 are coupled to a unison ring (not shown) in a known manner, which can be actuated to rotate the vane arms 76 in unison. Upon rotation of the vane arms 76, the arms 76*a*/76*b* exert a rotational force on the flat bearing surfaces 72*a*/72*b* in a "wrench-like" manner to thereby rotate the variable vanes 62 about their respective vane axes V.

As indicated above, the variable vane body 66 is formed of a first material and the pivot 72 of the trunnion 70 is formed of a second, different material. As an example, the first material has first a density and the second material has a second density that is greater than the first density. This permits the variable vane body 66 to be formed from a relatively light weight material while the pivot 72 is formed from a relatively heavier but stronger material that is able to better withstand the stresses applied from the vane arm 76 during rotation. Thus, in another aspect, the first material has first strength and a second material has a second strength that is greater than the first strength.

For mono-material variable vanes, the selection of the material is based upon the most severe factors, such as design stresses. For instance, a pivot is subject to relatively high stresses. Thus, even portions of the mono-material vane that are not subject to the most severe factors are formed of the same material, which can add weight and cost to the variable vanes. Alternatively, if the mono-material variable vane were formed of a lower strength material according to the lower design stresses at locations other than the pivot, the pivot may become damaged or may rapidly wear.

The multi-material variable vane 62 permits a wider range of material selection that can be tailored to the specific design factors of particular portions of the variable vane 62. For example, the first and second materials can be selected according to design factors of the variable vane body 66 and the pivot 72. The variable vane body 66 may be subjected to lower stresses than the pivot 72 and thus the first material need not be as strong or hard as the second material. Additionally, the variable vane body 66 and the pivot 72 can be subjected to different operating environments with respect to wear, corrosion, erosion and the like and thus the first and second materials can be selected in accordance with operating environment factors of the variable vane body 66 and the pivot 72. The flexibility in material selection thus allows benefits such as weight reduction, enhanced performance, lower cost and enhanced durability.

In further examples, the first material is selected from aluminum, aluminum-based alloys, magnesium, magnesium-based alloys, polymers, polymer-matrix composites or combinations thereof and the second material is selected from nickel, nickel-based alloys, titanium, titanium-based alloys, steel, cobalt, cobalt-based alloys or combinations thereof. Given this description, one of ordinary skill in the art will be able to select other materials that are different with respect to composition and/or mechanical properties to suit their particular needs.

Figure 7:
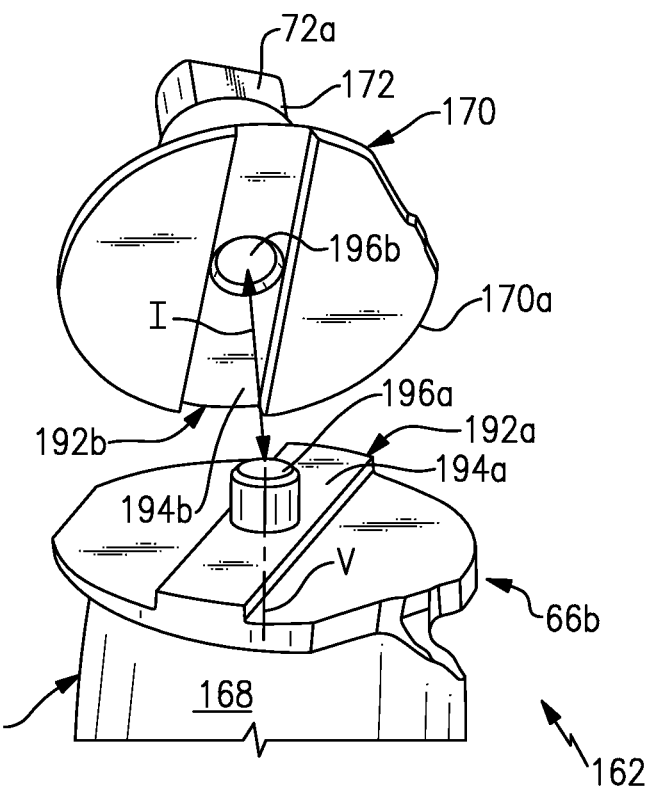
FIG. 7 illustrates a view of the anti-rotation members of the variable vane of FIG. 5.
Figures 5, 6:
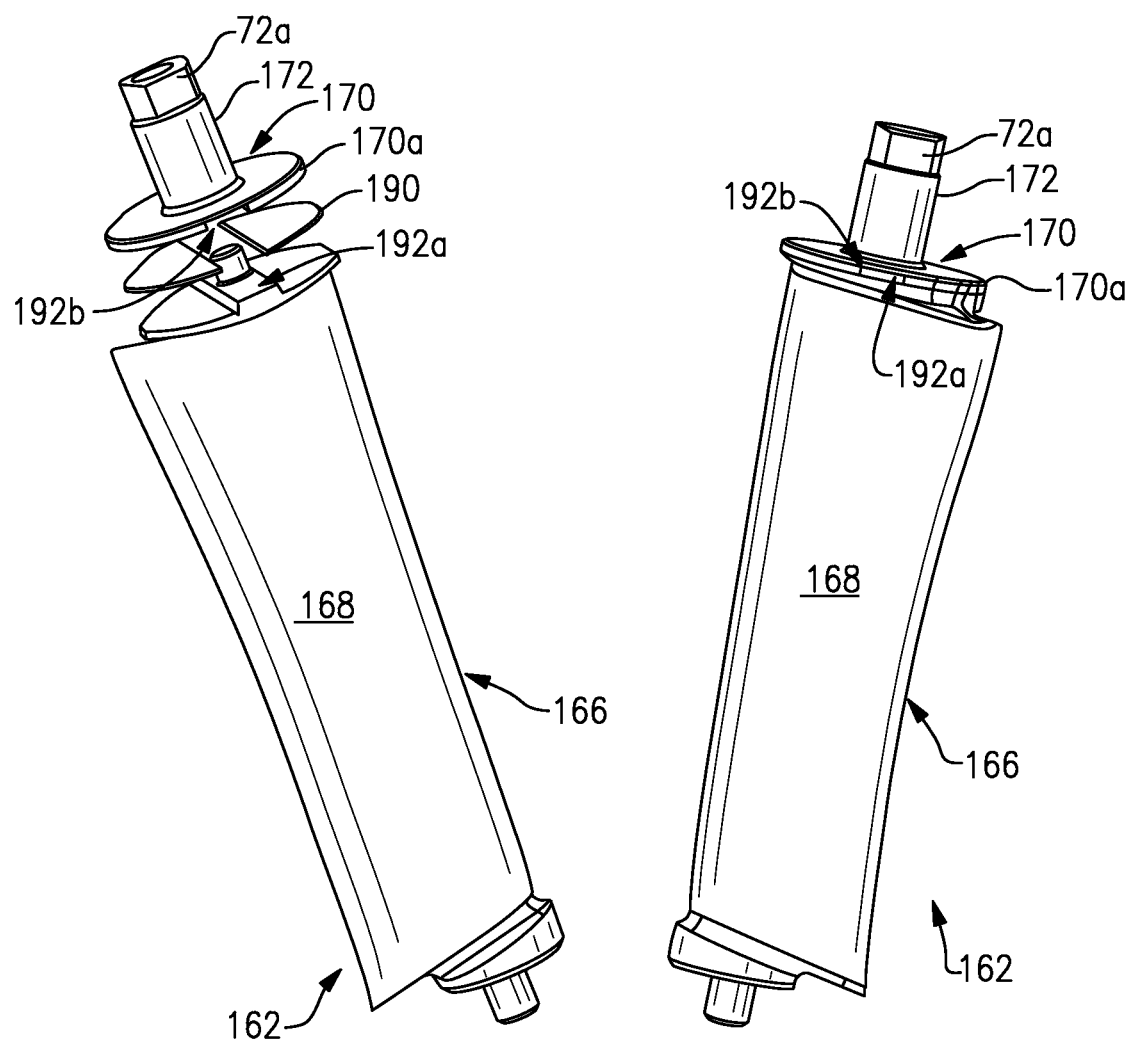
FIG. 5 illustrates another example variable vane that has anti-rotation members between a trunnion and a variable vane body.
FIG. 6 illustrates an exploded view of the variable vane body and trunnion of FIG. 5.

Referring to FIGS. 5-7, another variable vane 162 is shown. In this disclosure, like reference numerals designate like elements where appropriate and reference numerals with the addition of one-hundred or multiples thereof designate modified elements that are understood to incorporate the same features and benefits of the corresponding elements. In this example, the variable vane 162 includes a similar variable vane body 166 and airfoil portion 168 that is adhesively bonded to a trunnion 170 by an adhesive 190. As described above, the variable vane body 166 is formed of a first material and the pivot 172 of the trunnion 170 is formed of a second, different material.

In one example, the adhesive 190 includes a thermoset silicone rubber, room temperature vulcanizing rubber, epoxy or other polymeric-based adhesive for securing the trunnion 170 and the variable vane body 166 together. Alternatively, if the selected materials of the variable vane body 166 and the trunnion 170 permit, the trunnion 170 can be welded or brazed to the variable vane body 166.

The trunnion 170 includes a flange 170*a* at an inner end of the pivot 172. The flange 170*a* serves as a base of the pivot 172. The flange 170*a* and the pivot 172 can be a single, monolithic piece. For example, the trunnion 170 can be machined from a stock material, but is not limited to such.

In this example, the variable vane body 166 also includes a first anti-rotation member 192*a* and the trunnion 170 includes a second anti-rotation member 192*b* that interlock, as shown in FIG. 5, such that relative rotational movement between the trunnion 170 and the variable vane body 166 is limited. In this example, the first anti-rotation member 192*a* includes an elongated ridge 194*a* and the second anti-rotation member 192*b* includes an elongated channel 194*b*. When assembled, the elongated ridge 194*a* interlocks with the elongated channel 194*b*. Here, the elongated ridge 194*a* and elongated channel 194*b* extend in opposite directions relative to the vane axis V such that, once interlocked, the trunnion 170 and the variable vane body 166 are rotationally interlocked.

Optionally, the variable vane body 166 also includes a first alignment member 196*a* and the trunnion 170 includes a second alignment member 196*b* that inter-fit as represented at line I, to thereby align the central axes of each of the alignment members 196*a*/196*b*, which in this example are collinear with the vane axis V. The alignment members 196*a*/196*b* ensure that the pivot 172 of the trunnion 170 is properly oriented with regard to the variable vane body 166.

Figure 8:
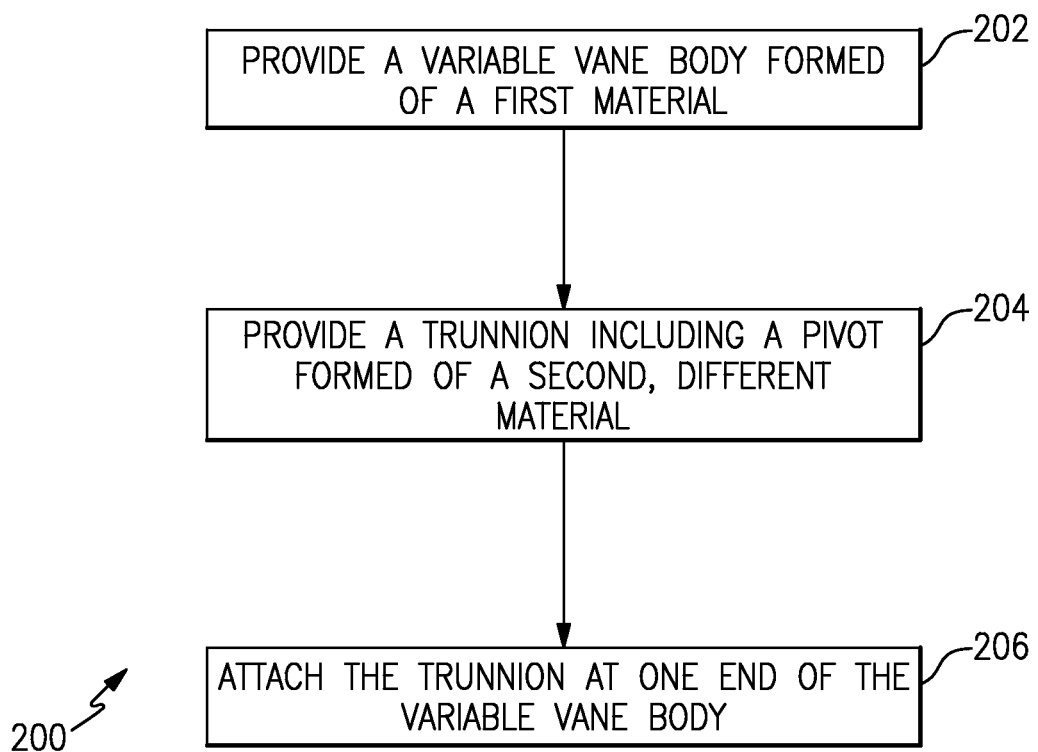
FIG. 8 illustrates a method of assembling a variable vane.

The variable vanes 62/162 described herein also embody an exemplary method 200 of assembling a variable vane, as schematically depicted in FIG. 8. In this example, the method 200 includes step 202 of providing the variable vane body 66/166 formed of the first material, step 204 of providing the trunnion 70/170 having the pivot 72/172 formed of the second material, and step 206 of attaching the trunnion 70/170 at one end of the variable vane body 66/166.

For example, the method 200 can be employed during an original manufacturing or as a repair process. In embodiments where the trunnion 170 is adhesively bonded to the variable vane body 166, the step 206 of attaching the trunnion 170 can include adhesively bonding the trunnion 170 to the variable vane body 166 using the adhesive material described herein. Alternatively, the attaching can include brazing or welding as also described above.

Although a combination of features is shown in the illustrated examples, not all of them need to be combined to realize the benefits of various embodiments of this disclosure.

In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A variable vane comprising:
   a variable vane body including an airfoil portion, the variable vane body being formed of a first material; and
   a trunnion attached at one end of the variable vane body, the trunnion including a pivot formed of a second, different material, wherein the first material has a first density and the second material has a second density that is greater than the first density.

2. A variable vane comprising:
   a variable vane body including an airfoil portion, the variable vane body being formed of a first material; and
   a trunnion attached at one end of the variable vane body, the trunnion including a pivot formed a second, different material, wherein the variable vane body includes a first anti-rotation member and the trunnion includes a second anti-rotation member that interlocks with the first anti-rotation member such that relative rotational movement between the trunnion and the variable vane body is limited.

3. The variable vane as recited in claim 2, wherein the first material is selected from the group consisting of aluminum, aluminum-based alloys, magnesium, magnesium-based alloys, polymers, polymer-matrix composites and combinations thereof, and the second material is selected from the group consisting of nickel, nickel-based alloys, titanium, titanium-based alloys, steel, cobalt, cobalt-based alloys and combinations thereof.

4. The variable vane as recited in claim 2, wherein the first material is an aluminum-based material and the second material is selected from the group consisting of nickel, nickel-based alloys, titanium, titanium-based alloys, steel, cobalt, cobalt-based alloys and combinations thereof.

5. The variable vane as recited in claim 2, wherein the first material is a polymer-matrix composite and a second material is selected from the group consisting of nickel, nickel-based alloys, titanium, titanium-based alloys, steel, cobalt, cobalt-based alloys and combinations thereof.

6. The variable vane as recited in claim 2, wherein the trunnion includes a flange connected to the pivot, and the flange is adhesively bonded to the variable vane body.

7. The variable vane as recited in claim 2, wherein the first material has a first strength and a second material has a second strength that is greater than first strength.

8. The variable vane as recited in claim 2, wherein one of the first anti-rotation member or the second anti-rotation member includes an elongated ridge and the other of the first anti-rotation member or the second anti-rotation member includes a channel.

9. A variable vane comprising:
   a variable vane body including an airfoil portion, the variable vane body being formed of a first material; and
   a trunnion attached at one end of the variable vane body, the trunnion including a pivot formed of a second, different material, wherein the variable vane body includes a first alignment member and the trunnion includes a second alignment member inter-fit with the first alignment member such that a central axis of the variable vane body aligns with a central axis of the pivot.

10. The variable vane as recited in claim 9, wherein one of the first alignment member or the second alignment member is a pin and the other of the first alignment member or the second alignment member is a hole.

11. The variable vane as recited in claim 2, wherein the pivot includes a plurality of flat bearing surfaces.

12. The variable vane as recited in claim 2, wherein the trunnion is adhesively bonded to the variable vane body.

13. The variable vane as recited in claim 2, wherein the trunnion is welded or brazed to the variable vane body.

14. A turbomachine comprising:
    optionally, a fan;
    a compressor section including a plurality of variable vanes, each of the plurality of variable vanes including a variable vane body having an airfoil portion, and a trunnion attached at one end of the variable vane body, the variable vane body being formed of a first material and the trunnion including a pivot formed of a second, different material, wherein the variable vane body includes a first anti-rotation member and the trunnion includes a second anti-rotation member that interlocks with first anti-rotation member such that relative rotational movement between the trunnion and the variable vane body is limited;
    a combustor in fluid communication with the compressor section; and
    a turbine section in fluid communication with the combustor.

15. The turbomachine as recited in claim 14, wherein the first material has a first density and the second material has a second density that is greater than the first density.

16. The turbomachine as recited in claim 14, wherein the first material is selected from the group consisting of aluminum, aluminum-based alloys, magnesium, magnesium-based alloys, polymers, polymer-matrix composites and combinations thereof, and a second material selected from the group consisting of nickel, nickel-based alloys, titanium, titanium-based alloys, steel, cobalt, cobalt-based alloys and combinations thereof.

17. A method of assembling a variable vane, the method comprising:
    providing a variable vane body including an airfoil portion, the variable vane body being formed of a first material and including a first anti-rotation member;
    providing a trunnion including a pivot formed of a second, different material and including a second anti-rotation member; and
    attaching the trunnion at one end of the variable vane body by interlocking the first anti-rotation member and the second anti-rotation member such that relative rotational movement between the trunnion and the variable vane body is limited.

18. The method as recited in claim 17, wherein the attaching includes adhesively bonding, welding or brazing the trunnion to the one end of the variable vane body.

* * * * *